(12) United States Patent
Kyle et al.

(10) Patent No.: US 12,420,744 B2
(45) Date of Patent: Sep. 23, 2025

(54) METHODS AND SYSTEMS FOR VEHICLES HAVING BATTERY AND RESERVE ENERGY STORAGE DEVICE

(71) Applicant: Toyota Motor North America, Inc., Plano, TX (US)

(72) Inventors: Roger Akira Kyle, Aubrey, TX (US); Timothy Wang, Ann Arbor, MI (US); Bryan Else Yamasaki, Frisco, TX (US); Justin K Shen, Canton, MI (US); Prince Ramos Remegio, McKinney, TX (US)

(73) Assignees: Toyota Motor North America, Inc., Plano, TX (US); Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 17/857,669

(22) Filed: Jul. 5, 2022

(65) Prior Publication Data
US 2024/0010166 A1    Jan. 11, 2024

(51) Int. Cl.
| | |
|---|---|
| *B60R 25/30* | (2013.01) |
| *B60L 50/60* | (2019.01) |
| *B60R 25/40* | (2013.01) |
| *H02J 7/00* | (2006.01) |

(52) U.S. Cl.
CPC .............. *B60R 25/30* (2013.01); *B60L 50/60* (2019.02); *B60R 25/40* (2013.01); *H02J 7/0063* (2013.01); *H02J 7/0068* (2013.01); *B60R 2325/10* (2013.01)

(58) Field of Classification Search
CPC ..... B60R 25/30; B60R 2325/10; B60L 50/60; H02J 7/0063; H02J 7/0068
USPC .................................................. 307/9.1–10.1
See application file for complete search history.

(56) References Cited

U.S. PATENT DOCUMENTS

| | | | | |
|---|---|---|---|---|
| 4,182,110 A | * | 1/1980 | Kamiwaki | G04C 10/00 307/64 |
| 5,965,954 A | * | 10/1999 | Johnson | B60R 25/04 307/10.3 |
| 9,487,103 B2 | * | 11/2016 | Berman | B60W 10/26 |
| 10,507,799 B1 | * | 12/2019 | Gilbert-Eyres | B60R 25/32 |
| 11,567,503 B1 | * | 1/2023 | Roy | G05D 1/028 |
| 2010/0055546 A1 | | 3/2010 | Elder et al. | |
| 2010/0228425 A1 | | 9/2010 | Tanaka | |

(Continued)

FOREIGN PATENT DOCUMENTS

| | | |
|---|---|---|
| CN | 102252253 A | 11/2011 |
| CN | 103904375 A | 7/2014 |

(Continued)

OTHER PUBLICATIONS

Charging Device and anti-theft device (Year: 2007).*

(Continued)

*Primary Examiner* — Rexford N Barnie
*Assistant Examiner* — Terrence R Willoughby
(74) *Attorney, Agent, or Firm* — Dinsmore & Shohl LLP (57) ABSTRACT

A method for a vehicle having a main battery and a reserve energy storage device is provided. The method includes determining occurrence of a triggering event associated with the vehicle, and transferring power from the main battery to the reserve energy storage device in response to the triggering event to render the vehicle not drivable.

15 Claims, 3 Drawing Sheets

(56) References Cited

U.S. PATENT DOCUMENTS

| | | | |
|---|---|---|---|
| 2011/0270480 A1 | 11/2011 | Ishibashi et al. | |
| 2014/0022066 A1* | 1/2014 | Richardson | B60R 25/01 |
| | | | 340/426.2 |
| 2015/0001943 A1 | 1/2015 | Bartling et al. | |
| 2015/0298630 A1* | 10/2015 | Iwai | B60R 16/033 |
| | | | 324/426 |
| 2016/0375862 A1* | 12/2016 | Ito | G05D 1/0246 |
| | | | 348/148 |
| 2018/0366965 A1 | 12/2018 | Ghabra et al. | |
| 2019/0263290 A1 | 8/2019 | Monahan et al. | |
| 2020/0139929 A1* | 5/2020 | Turley | G01S 19/16 |
| 2020/0298797 A1* | 9/2020 | Shin | B60R 25/045 |
| 2022/0258647 A1* | 8/2022 | Joao | B60L 53/24 |
| 2022/0258648 A1* | 8/2022 | Wu | B60L 58/22 |
| 2022/0371547 A1* | 11/2022 | Shin | B60R 25/1001 |

FOREIGN PATENT DOCUMENTS

| | | | | |
|---|---|---|---|---|
| EP | 3950479 A1 | | 2/2022 | |
| JP | 3901566 B2 * | | 4/2007 | Y02T 10/70 |
| JP | 2014158335 A | | 8/2014 | |
| JP | 2016052847 A | | 4/2016 | |
| KR | 101315645 B1 | | 10/2013 | |
| WO | WO-2019180641 A1 * | | 9/2019 | |

OTHER PUBLICATIONS

Batteries for hybrid and plug-in electric vehicles, (https://afdc.energy.gov/vehicles/electric_batteries.html), Accessed Feb. 23, 2022.

* cited by examiner

METHODS AND SYSTEMS FOR VEHICLES HAVING BATTERY AND RESERVE ENERGY STORAGE DEVICE

TECHNICAL FIELD

The present disclosure relates to vehicles and, more specifically, to methods and systems for vehicles deter or prevent vehicle theft.

BACKGROUND

Vehicles are often subject to theft. Some systems may exist to incapacitate a vehicle when a triggering event caused by theft occurs, but such systems are not adapted to electrically powered vehicles.

SUMMARY

In accordance with one aspect, a method for a vehicle having a main battery and a reserve energy storage device is provided. The method includes determining occurrence of a triggering event associated with the vehicle, and transferring power from the main battery to the reserve energy storage device in response to the triggering event to render the vehicle not drivable.

In accordance with another aspect, a method for a vehicle having a main battery and a reserve energy storage device is provided. The method includes determining occurrence of a triggering event associated with a vehicle, and discharging power in the reserve energy storage device in response to the triggering event.

In accordance with yet another aspect, a system is provided. The system includes, a vehicle having a main battery and a reserve energy storage device. The main battery transfers power to the reserve energy storage device in response to determination of a triggering event to render the vehicle not drivable, the triggering event is associated with the vehicle.

Although the concepts of the present disclosure are described herein with primary reference to user-driven automobiles, it is contemplated that the concepts will enjoy applicability to any vehicle, user-driven or autonomous. For example, and not by way of limitation, it is contemplated that the concepts of the present disclosure will enjoy applicability to autonomous automobiles.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The present disclosure relates generally to a vehicle having a main battery and a reserve energy storage device (e.g., a battery, a capacitor, or the like). During normal operation of the vehicle, the main battery supplies electrical power to driving components and the reserve energy storage device stores or discharges power received from the main battery, or may provide electrical power to other, non-driving components of the vehicle. If a triggering event occurs, the methods and systems described herein cause stored electrical power in the main battery to be transferred to the reserve energy storage device or discharged such that the driving components cannot be operated, thereby rendering the vehicle not drivable. However, power that remains in the reserve energy storage device can be used to power the other, non-driving components so that operation of such components is still possible (e.g., operation of components that allow a theft alert to be transmitted by the vehicle, operation of locating components, etc.). As a result, the vehicle is immobilized to deter theft, but still receives power for components that can be used for the purposes of, for example, locating the vehicle, retrieving the vehicle, recording video and/or images, and/or the like.

Figure 1:
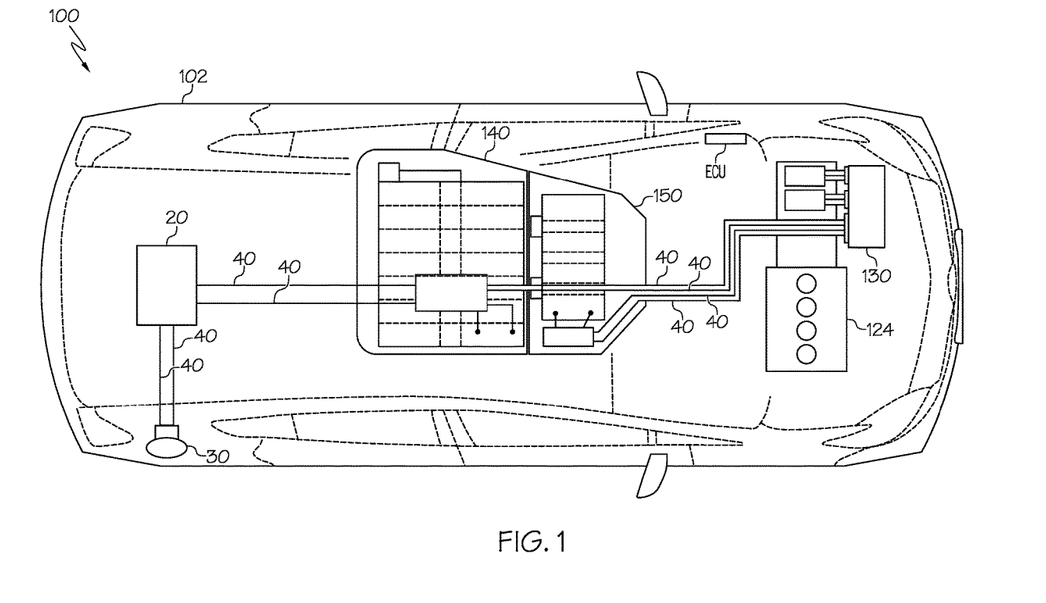
FIG. 1 depicts a perspective view of an illustrative system in a vehicle including a main battery and a reserve energy storage device, according to one or more embodiments shown and described herein.

Referring now to FIG. 1, a system 100 including a vehicle 102 is illustrated. The vehicle 102 is an electric vehicle (EV) including a vehicle that operates solely on electrical power, a hybrid electric vehicle, a semi-hybrid electric vehicle, or the like. The vehicle 102 includes various components including a powertrain 124, a controller 130, a main battery 140, and a reserve energy storage device 150 disposed in a body of the vehicle 102. Lines 40 (e.g., electrical wires, lead wires, cables, bus bars, or the like) electrically connect various components of the vehicle 102 to transfer power received from a charging inlet 30 to a battery charger 20 and to the main battery 140 and/or the reserve energy storage device 150. The lines 40 may include a pair of a positive wire and a negative wire.

The battery charger 20 may include a power factor correction circuit and/or a converter. The battery charger 20 may convert power to charge the main battery 140. For example, the AC power received from a power supply may be converted to DC power by the battery charger 20. In embodiments, the battery charger 20 may be a wireless charger in addition to or instead of the charging inlet 30 for plug-in charging the main battery 140. Such a wireless charger may include components for coupling to an inductive component generating an electromagnetic field. The vehicle 102 may be chargeable at vehicle charging station or through a household power supply either wired or wirelessly. Various features for charging should be understood and are not described further herein.

The lines 40 also connect the main battery 140 to the reserve energy storage device 150. The main battery 140 and the reserve energy storage device 150 are connected to each other to receive and/or transfer electrical power between the main battery 140 and the reserve energy storage device 150. In embodiments, the reserve energy storage device 150 may transfer stored power to the main battery 140. In embodiments, the main battery 140 is capable of transferring electrical power received from the battery charger 20 to the reserve energy storage device 150. In other embodiments, the reserve energy storage device 150 is capable of transferring electrical power to the main battery 140, including electrical power that was transferred to the reserve energy storage device 150 from the main battery 140 and/or electrical power that was transferred to the reserve energy storage device 150 from the battery charger 20.

Figure 2:
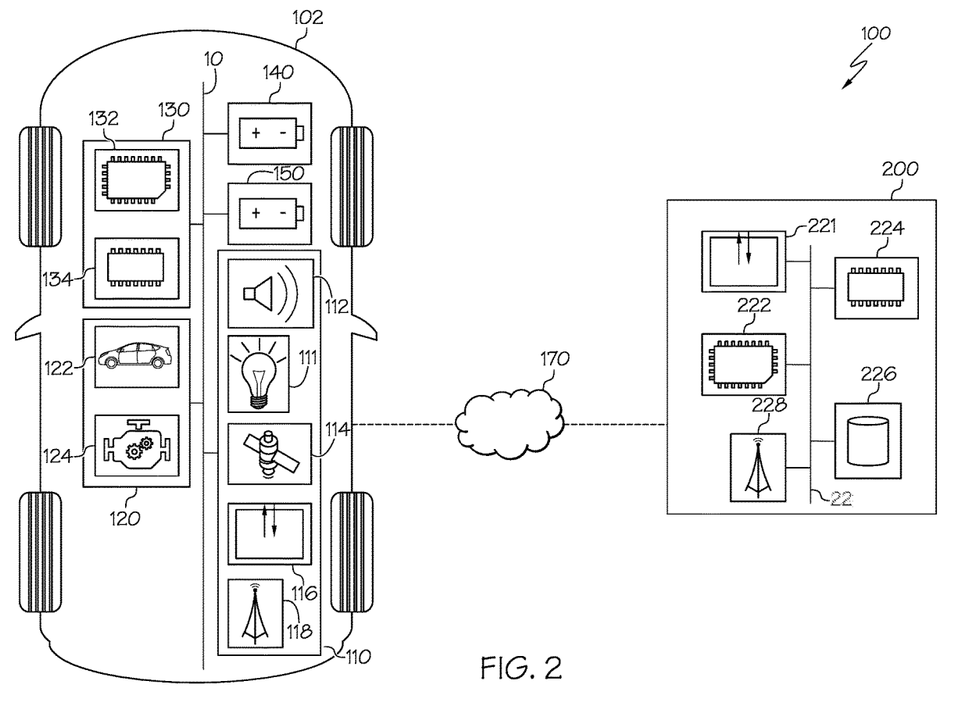
FIG. 2 schematically depicts the illustrative system of FIG. 1, according to one or more embodiments shown and described herein.

The main battery 140 may be a rechargeable battery (e.g., a lithium ion battery, a lithium ion polymer battery, a lithium polymer battery, or the like, including batteries now known or later developed). The main battery 140 is capable of discharging its power by transferring power to the reserve energy storage device 150. For example, the main battery 140 may discharge its stored power by transferring the power to the reserve energy storage device 150. The main battery 140 may also be capable of discharging power by supplying power to various components of the vehicle 102 that consume electric energy. Referring to FIGS. 1 and 2, the main battery 140 supplies power to driving components 120 for driving the vehicle 102. In embodiments, the driving components 120 include the powertrain 124, a driving assist module 122, brake system, or the like.

The powertrain 124 may be a motor generator that both drives and generates electricity to charge the main battery 140. The driving assist module 122 assist driving utilizing data. The data may be gathered by the driving assist module 122 may be used to perform various driving assistance including, but not limited to advanced driver-assistance systems (ADAS), adaptive cruise control (ACC), cooperative adaptive cruise control (CACC), lane change assistance, anti-lock braking systems (ABS), collision avoidance system, automotive head-up display, and the like. The driving components 120 may further include a transmission transferring mechanical power from the powertrain 124 to drive wheels of the vehicle 102. When there is not enough power or no power supplied to one or more of the driving components 120, the vehicle 102 may become not drivable.

The reserve energy storage device 150 may be a rechargeable battery (e.g., a lithium ion battery, a lithium ion polymer battery, a lithium polymer battery, or the like, including batteries now known or later developed) or another energy storage device such as a capacitor. The capacitor may be a high capacity capacitor (e.g., electrostatic double-layer capacitor (EDLC), electrochemical pseudocapacitor, lithium-ion capacitor, or the like). The reserve energy storage device 150 is capable of receiving power from the battery charger 20 or the main battery 140. The reserve energy storage device 150 may be capable of discharging power stored in the reserve energy storage device 150 by supplying power to various components of the vehicle 102 that consume electric energy, with the exception of the components capable of driving the vehicle 102 (e.g., the driving components 120) so that the vehicle 102 is effectively immobilized when power is not located in the main battery 140 (e.g., only located in the reserve energy storage device 150). In embodiments, the reserve energy storage device 150 may include power consumption module (e.g., a resistance, a ground, or the like) which may consume power to discharge power stored in the reserve energy storage device 150.

The controller 130 controls power transfer between the various components of the vehicle 102. The controller 130 may be a power control unit (PCU) controlling receiving, charging, transferring, or discharging of power. The main battery 140 and the reserve energy storage device 150 are communicatively connected to the controller 130 such that communications signals can be transmitted between the controller 130, the main battery 140, and the reserve energy storage device 150, which will be discussed later in details with reference to FIG. 2.

The powertrain 124 may be an electric motor (e.g., a DC series motor, a brushless DC motor (BLDC), a permanent magnet synchronous motor (PMSM), an induction motor, or the like) receiving power from the main battery 140 to drive the vehicle 102. Generally speaking, the powertrain 124 is not a hybrid powertrain (e.g., a powertrain containing a combination of an internal combustion engine, an electric motor, and/or the like). However, it should be appreciated that the present disclosure may be configured to function on a hybrid powertrain in embodiments where the electric motor is required for mobility and operation of the non-electric motor components (e.g., an internal combustion engine).

Referring to FIG. 2, the system 100 of the vehicle 102 is depicted. The system 100 may include the vehicle 102 and/or a server 200. The vehicle 102 may include a communication path 10 that communicatively couples various components of the vehicle 102. As used herein, the phrase "communicatively connected" or "communicatively coupled" means that coupled components are capable of exchanging data signals with one another such as, e.g., electrical signals via a conductive medium, electromagnetic signals via air, optical signals via optical waveguides, and the like.

Accordingly, the communication path 10 may be formed from any medium that is capable of transmitting a signal such as, e.g., conductive wires, conductive traces, optical waveguides, and the like. In some embodiments, the communication path 10 may facilitate the transmission of wireless signals, such as Wi-Fi, Bluetooth®, Near-Field Communication (NFC), and the like. Moreover, the communication path 10 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 10 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The vehicle 102 may include the controller 130 including a processor 132, a memory 134. The processor 132 may include one or more processors that may be any device capable of executing machine-readable and executable instructions. Accordingly, each of the one or more processors of the processor 132 may be an integrated circuit, a microchip, or any other computing device. The processor 132 is communicatively coupled to the communication path 10 that provides signal connectivity between the various components of the connected vehicle. Accordingly, the communication path 10 may communicatively couple any number of processors of the processor 132 with one another and allow them to operate in a distributed computing environment. Specifically, each processor may operate as a node that may send and/or receive data.

The memory 134 is communicatively coupled to the communication path 10 and may contain one or more memory modules comprising RAM, ROM, flash memories, hard drives, or any device capable of storing machine-readable and executable instructions such that the machine-readable and executable instructions can be accessed by the processor 132. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory 134. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented on any conventional computer programming language, as pre-programmed hardware elements, or as a combination of hardware and software components.

The main battery 140 and the reserve energy storage device 150 may receive instructions from the controller 130 via the communication path 10. For example, the main battery 140 is coupled to the communication path 10 such that the controller 130 may instruct the main battery 140 to manage power. The main battery 140 may receive instructions from the controller 130. In embodiments, the instructions may be received from a server 200 via a network 170. Similarly, the reserve energy storage device 150 is coupled to the communication path 10 such that the controller 130 may instruct the reserve energy storage device 150 to manage power. The reserve energy storage device 150 may receive instructions from the controller 130. In embodiments, the instructions may be received from the server 200 via the network 170.

In embodiments, the controller 130 controls charging and discharging of the main battery 140 and the reserve energy storage device 150 by monitoring data received from the vehicle 102. For example, the data may include information pertaining to the power level of the main battery 140 and the reserve energy storage device 150 as reported by sensors associated with the main battery 140 and the reserve energy storage device 150, respectively. The controller 130 may instruct a charging circuit of the main battery 140 and a charging circuit of the reserve energy storage device 150 to control transfer of power between the main battery 140 and the reserve energy storage device 150 by controlling switches or the like to cause transfer of power between the main battery 140 and the reserve energy storage device 150. For example, the controller 130 may instruct the main battery 140 to close a switch between circuitry of the main battery 140 and the reserve energy storage device 150 so as allow an electrical connection between the main battery 140 and the reserve energy storage device 150 for the purposes of transferring power between the devices (e.g., transfer power from the main battery 140 to the reserve energy storage device 150). Such a switch may remain closed until the main battery 140 power level is down to zero or substantially low such that the main battery 140 is unable to supply enough power to the powertrain 124 to drive wheels of the vehicle 102 based on the determination of the triggering event.

The controller 130 may manage power distribution among the various components of the vehicle 102 to operate the vehicle 102 accordingly based on the data received from the vehicle 102 or instructions externally received via a network 170 (shown in FIG. 2) indicative of the triggering event. For example, the controller 130 may be programmed to determine whether to instruct discharge of electrical power from the main battery 140 and/or the reserve energy storage device 150 based on the data received from the vehicle 102 or the externally received instructions indicative of the triggering event. The controller 130 may instruct to transfer power from the main battery 140 to the driving components 120 based on the data received from the vehicle 102 or the externally received instructions. In embodiments, the data may be received from non-driving components of the vehicle 102.

The non-driving components are not involved in physically driving the vehicle 102. For example, the non-driving components may include a communication module 110 including an audio module 112, a visual module 111, a location module 114, an input/output (I/O) interface 116, and a network interface 118. The communication module 110 provide communication between the vehicle 102 and the server 200, between the vehicle 102 and another vehicle, or between the vehicle 102 and a user. The reserve energy storage device 150 may be configured to supply power to the non-driving components when the main battery 140 has not enough power to operate the non-driving components.

The audio module 112 and the visual module 111 is coupled to the communication path 10 such that the communication path 10 communicatively couples the audio module 112 and the visual module 111 to other components or modules of the vehicle 102. The audio module 112 may be a speaker, a buzzer, or a siren that generates sound to communicate to a user, which may draw attention from the user. The audio module 112 may further include a microphone to receive sound, which may provide instructions to the vehicle 102. The visual module 111 may be a light (e.g., light emitting diode (LED) light, or the like) to draw attention from the user, or may be a camera (e.g., a surround view camera, or the like) to capture images of the vehicle 102, the area surrounding the vehicle 102, or the presence of other vehicles or people in the vicinity of the vehicle 102.

The location module 114 is coupled to the communication path 10 such that the communication path 10 communicatively couples the location module 114 to other components or modules of the vehicle 102. The location module 114 (e.g., a GPS radio) may comprise one or more antennas configured to receive signals from global positioning system (GPS) satellites. Specifically, in one embodiment, the location module 114 includes one or more conductive elements that interact with electromagnetic signals transmitted by GPS satellites. The received signal is transformed into a data signal indicative of the location (e.g., latitude and longitude) of the location module 114, and consequently, the vehicle 102.

The I/O interface 116 may allow for data to be presented to a human driver and for data to be received from the driver. For example, the I/O interface 116 may include a screen to display information to a user, speakers to present audio information to the user, and a touch screen that may be used by the user to input information. The interface may output information that the vehicle 102 received from the server 200. For example, the I/O interface 116 may display power level of the main battery 140 and/or the reserve energy storage device 150, receive or display instructions to manage power transfer, discharge, or charge of the main battery 140 and/or the reserve energy storage device 150.

The network interface 118 (e.g., a cellular radio) that includes hardware for communicatively coupling the vehicle 102 to the server 200. The network interface 118 can be communicatively coupled to the communication path 10 and can be any device capable of transmitting and/or receiving data via a network or other communication mechanisms. Accordingly, the network interface 118 can include a communication transceiver for sending and/or receiving any wired or wireless communication. For example, the hardware of the network interface 118 may include an antenna, a modem, a LAN port, a Wi-Fi card, a WiMAX card, a cellular modem, near-field communication hardware, satellite communication hardware, and/or any other wired or wireless hardware for communicating with other networks and/or devices.

The vehicle 102 may connect with one or more other connected vehicles and/or external processing devices (e.g., the server 200) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location-based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

In some embodiments, the vehicle 102 may be communicatively coupled to the server 200 by a network 170 via the network interface 118. The network 170 may be a wide area network, a local area network, a personal area network, a cellular network, a satellite network, and the like.

The server 200 comprises a processor 222, a memory component 224, a network interface 228, a data storage component 226, and a communication path 22. Each server 200 component is similar in features to its connected vehicle counterpart, described in detail above. It should be understood that the components illustrated in FIG. 2 are merely illustrative and are not intended to limit the scope of this disclosure. More specifically, while the components in FIG. 2 are illustrated as residing within vehicle 102, this is a non-limiting example. In some embodiments, one or more of the components may reside external to vehicle 102, such as with the server 200.

Figure 3:
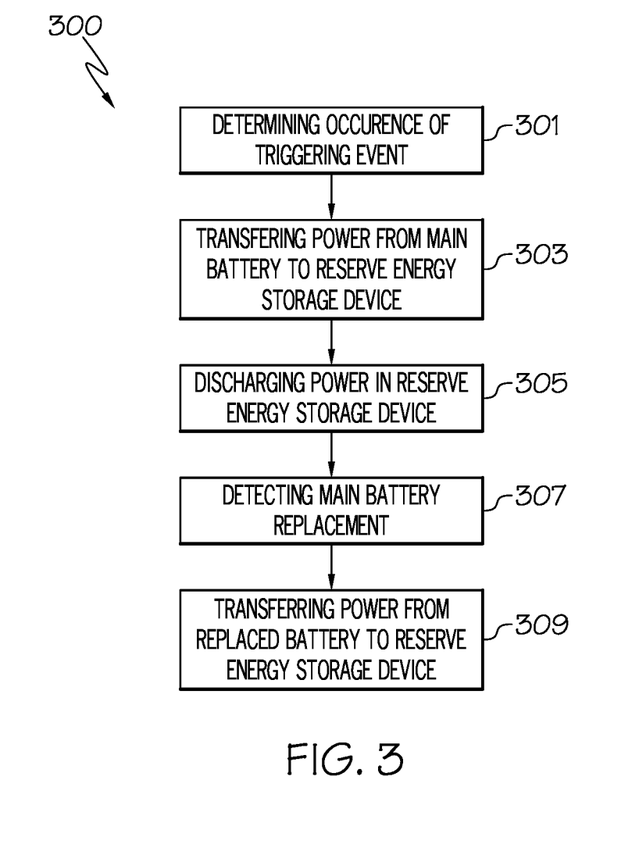
FIG. 3 schematically depicts an illustrative method for utilizing the reserve energy storage device of FIG. 1, according to one or more embodiments shown and described herein.

Referring now to FIG. 3, a flowchart of an illustrative method 300 for the vehicle 102 is depicted. The method 300 may be carried out by the vehicle 102 of FIGS. 1 and 2. The memory 134 of the vehicle 102 may store machine-readable instructions that, when executed by the processor 132, may cause the processor 132 to perform steps of the method 300. It should be understood that the method 300 may also or instead be performed by a server 200 of FIG. 2 or any other computing device.

At step 301, occurrence of triggering event is determined. The triggering event may indicate the vehicle 102 is stolen or subject to theft. The occurrence of the triggering event may be determined by the vehicle 102, as described herein.

The triggering event may be determined based on data obtained from various components of the vehicle 102, including, but not limited to, the audio module 112, the visual module 111, and/or the location module 114. For example, the audio module 112 may detect sound indicative of theft, such as, for example, noises that are determined to be associated with a breaking of glass (e.g., windows, doors, or the like). The visual module 111 may detect an image of a non-authenticated person present in the vicinity of the vehicle 102 more than a predetermined time and/or contacting/touching the vehicle 102. The location module 114 may provide location data indicative of the vehicle 102 departing from a normal driving area (e.g., an area in which the vehicle 102 usually drives, which may be determined from an analysis or learning of past driving activity). As such, abnormal activities detected by the various modules of the vehicle 102 may provide data indicative of the vehicle 102 being stolen or subject to theft. The data may be processed by the processor 132 and/or stored in the memory 134 for determination of the triggering event.

In embodiments, the triggering event may be determined by the server 200 communicatively coupled to the vehicle 102. The server 200 may be operated by a user, an owner of the vehicle 102, a law enforcement entity, a customer center, or any third party. An operator of the server 200 may send instructions to the vehicle 102. For example, the operator may be notified the occurrence of the triggering event. The notified operator may send the instructions to the vehicle 102 to deter theft. In embodiments, the server 200 may be substituted for a user device which functions similarly to the server 200. The user device may send the instructions to the vehicle 102 to the vehicle 102 upon determining of the triggering event or upon receiving instructions to send the instructions to the vehicle 102 from the server 200 or an input from a user of the user device.

At step 303, power in the main battery 140 is transferred to the reserve energy storage device 150. The power may be transferred upon determination of the occurrence of the triggering event. For example, the triggering event triggers the instructions to be generated or sent to the vehicle 102. Therefore, the power may be transferred upon receipt of the instructions. The instructions may render the vehicle 102 not drivable upon execution. For example, the instructions may instruct to transfer the power from the main battery 140 to the reserve energy storage device 150 such that the main battery 140 does not have enough power to drive the vehicle 102. The vehicle 102 may not be drivable when the power left in the main battery 140 is below a predetermined value or no power is left in the main battery 140.

In embodiments, the triggering event may activate the audio module 112 and the visual module 111 to send out audio and visual alarms to draw attention from people around the vehicle 102 or to gather audio and visual data from environment surrounding the vehicle 102. The data gathered from the audio module 112 and/or the visual module 111 may be used to determine the status of the vehicle 102 or be sent out via the network 170 to notify stakeholders (an owner of the vehicle 102, a person or an organization authorized by the owner, insurance providers, law enforcement officers, etc.). The reserve energy storage device 150 may supply power to the audio module 112 and the visual module 111 such that the alarms may be sent when the main battery 140 is not available to supply power. The triggering event may be communicated to the stakeholders via the network 170. In embodiments, the reserve energy storage device 150 may supply power to the location module 114 to provide data associated with the location of the vehicle 102 to the stakeholders. The location data may be provided via the network 170.

The power transferred to the reserve energy storage device 150 is stored in the reserve energy storage device 150. In embodiments, the reserve energy storage device 150 may have at least the same capacity with the main battery 140 such that the reserve energy storage device 150 may receive all the power stored in the main battery 140. In embodiments, the reserve energy storage device 150 may have higher capacity than the main battery 140 such that the reserve energy storage device 150 is capable of receiving all the power stored in the main battery 140 even when the reserve energy storage device 150 is not empty prior to receiving the power stored in the main battery 140. In embodiments, the reserve energy storage device 150 may not have a higher capacity than the main battery 140. In such case, the capacity of the reserve energy storage device 150 may be configured to receive enough energy from the main battery 140 so that to render any remaining power stored by the main battery 140 not sufficient for operation of the powertrain 124 of the vehicle 102.

At step 305, power in the reserve energy storage device 150 is discharged. In embodiments, discharging power in the reserve energy storage device 150 may render the vehicle 102 not drivable in case when the reserve energy storage device 150 is configured to supply power to driving components 120. In embodiments, determination of the occurrence of the triggering event may trigger discharging power in the reserve energy storage device 150. Discharging power may make the reserve energy storage device 150 available to receive power transferred from the main battery 140. Therefore, step 305 may occur before the above described step 303.

At step 307, replacement of the main battery 140 is detected. In embodiments, replacement of the main battery 140 may be the triggering event when the replacement is not authorized. For example, replacement of the main battery 140 may be indicative of vehicle theft when the owner or other stakeholders of the vehicle 102 did not authorize the replacement. For example, the owner may authorize the replacement directly or indirectly via the network 170 or the I/O interface 116 to the controller 130. Detection of the replacement of the main battery 140 may be completed by detecting disconnection of the main battery 140 from the vehicle 102 or by detecting a power level of a new battery (i.e., a replaced battery), detecting an inputted code, and/or the like. The detection of disconnection of the main battery 140 or the connection of the new battery may trigger requesting authorization from the owner or other stakeholders. When replacement of the main battery 140 is detected, step 305 may be performed to discharge power in the reserve energy storage device 150 to empty the reserve energy storage device 150 to be prepared to transfer power from the new battery to the reserve energy storage device 150.

At step 309, power in the new battery may be transferred to the reserve energy storage device 150. The power in the new battery may be transferred to the reserve energy storage device 150 in response to detecting the replacement of the main battery 140. Step 305 may be performed after step 309 to discharge power from the reserve energy storage device 150 to be prepared to receive power.

Step 309 is not performed when the replacement of the main battery 140 is not determined as the triggering event. For example, the replacement is authorized by the owner or other stakeholders of the vehicle 102, the new battery will supply power to the vehicle 102. Also, step 309 is not performed when the disconnected main battery 140 is reconnected to the vehicle 102. For example, the main battery 140 may be disconnected for repair and then reconnected to the vehicle 102. The owner or other stakeholders may authorize the replacement of the main battery 140, and the main battery 140 will supply power to the vehicle 102.

It should now be understood that the embodiments disclosed herein include methods and systems for deter or prevent theft of the vehicle. Embodiments may render the vehicle not drivable by discharging power from the main battery. The power stored in the main battery may be transferred to the reserve energy storage device. The power received by the reserve energy storage device may be discharged by consuming power, losing power through ground, or the like. The reserve energy storage device may provide power to the vehicle to operate theft deterrence or prevention functions, such as alarming or sending out messages to communicate the status of the vehicle.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open-ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method for a non-hybrid electric vehicle having an electric-only powertrain, a main battery powering the electric-only powertrain, and a reserve energy storage device, the method comprising:
   determining an occurrence of a triggering event associated with the non-hybrid electric vehicle; and
   transferring power from the main battery to the reserve energy storage device in response to the triggering event until the non-hybrid electric vehicle is not drivable due to the main battery having a charge level that is insufficient for powering vehicle drive components of the electric-only powertrain.

2. The method of claim 1, wherein the main battery is configured to supply power to the non-hybrid electric vehicle for driving, and the reserve energy storage device is configured to receive power from the main battery.

3. The method of claim 1, further comprising:
discharging power in the reserve energy storage device in response to the triggering event.

4. The method of claim 1, wherein the reserve energy storage device supplies power to a non-driving component of the non-hybrid electric vehicle, and the non-driving component is configured to provide location information of the non-hybrid electric vehicle.

5. The method of claim 4, wherein the non-driving component of the non-hybrid electric vehicle includes at least one of a GPS radio and a cellular radio.

6. The method of claim 1, wherein the triggering event is indicative of the non-hybrid electric vehicle being stolen.

7. The method of claim 1, further comprising:
detecting the main battery is replaced with a new battery; and
transferring power in the new battery to the reserve energy storage device in response to the detecting the replacement.

8. The method of claim 2, wherein a power capacity of the reserve energy storage device is larger than a power capacity of the main battery.

9. A system, comprising:
a non-hybrid electric vehicle having an electric-only powertrain, a main battery powering the electric-only powertrain, and a reserve energy storage device; and
a controller coupled to the main battery and the reserve energy storage device, the controller configured to cause a transfer of power from the main battery to the reserve energy storage device in response to a determination of a triggering event that is associated with the non-hybrid electric vehicle and until the non-hybrid electric vehicle is not drivable due to the main battery having a charge level that is insufficient for powering vehicle drive components of the electric-only powertrain.

10. The system of claim 9, wherein the main battery is configured to supply power to the non-hybrid electric vehicle for driving, and the reserve energy storage device is configured to receive power from the main battery.

11. The system of claim 9, wherein the power in the reserve energy storage device is discharged in response to the triggering event.

12. The system of claim 9, further comprising:
a non-driving component of the non-hybrid electric vehicle configured to provide location information of the electric vehicle,
wherein the reserve energy storage device supplies power to the non-driving component.

13. The system of claim 12, wherein the non-driving component of the non-hybrid electric vehicle includes at least one of a GPS radio and a cellular radio.

14. The system of claim 9, wherein the triggering event is indicative of the non-hybrid electric vehicle being stolen.

15. The system of claim 10, wherein a power capacity of the reserve energy storage device is larger than a power capacity of the main battery.

* * * * *